(12) United States Patent
Doi

(10) Patent No.: US 11,648,820 B2
(45) Date of Patent: May 16, 2023

(54) VEHICLE INSTRUMENT PANEL STRUCTURE

(71) Applicant: Toyota Jidosha Kabushiki Kaisha, Toyota (JP)

(72) Inventor: Madoka Doi, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 200 days.

(21) Appl. No.: 16/718,662

(22) Filed: Dec. 18, 2019

(65) Prior Publication Data

US 2020/0247217 A1   Aug. 6, 2020

(30) Foreign Application Priority Data

Feb. 1, 2019   (JP) .............................. JP2019-017041

(51) Int. Cl.
| | |
|---|---|
| *B60H 1/24* | (2006.01) |
| *B60K 35/00* | (2006.01) |
| *B60S 1/54* | (2006.01) |
| *B60H 1/34* | (2006.01) |
| *B62D 25/14* | (2006.01) |

(52) U.S. Cl.
CPC ........... *B60H 1/247* (2013.01); *B60H 1/3407* (2013.01); *B60K 35/00* (2013.01); *B60S 1/54* (2013.01); *B62D 25/142* (2013.01)

(58) Field of Classification Search
CPC ...... B60H 1/247; B60H 1/3407; B60K 35/00; B60S 1/54; B62D 25/142
USPC ........................................................ 454/124
See application file for complete search history.

(56) References Cited

U.S. PATENT DOCUMENTS

| | | | | | |
|---|---|---|---|---|---|
| 4,109,562 | A | * | 8/1978 | MacDonald ............... | B60S 1/56 454/127 |
| 4,439,013 | A | * | 3/1984 | Hagn ....................... | B60R 1/081 359/509 |
| 4,459,901 | A | * | 7/1984 | Watanaby ................. | B60S 1/56 454/124 |
| 6,089,971 | A | * | 7/2000 | Jokela ..................... | B60H 1/242 454/127 |
| 2017/0182943 | A1 | * | 6/2017 | Hoenninger ............. | B60Q 9/00 |

FOREIGN PATENT DOCUMENTS

| | | | | |
|---|---|---|---|---|
| FR | 2744090 A1 | * | 8/1997 | ............. B60H 1/242 |
| JP | 2010-023540 A | | 2/2010 | |
| JP | 2014-076682 A | | 5/2014 | |

* cited by examiner

*Primary Examiner* — Allen R. B. Schult
(74) *Attorney, Agent, or Firm* — Dinsmore & Shohl LLP

(57) ABSTRACT

A vehicle instrument panel structure is provided including a blower outlet and a guide member. The blower outlet is provided between a meter section on an instrument panel provided at a front section of a vehicle cabin and an interior member of a vehicle door, and is capable of blowing an airflow substantially toward a vehicle rear side. The guide member is provided at the vehicle rear side of the blower outlet so as to block the blower outlet from view of an occupant sitting in a vehicle seat provided inside the vehicle cabin, and extends at an angle toward the vehicle rear side on progression from a location corresponding to the blower outlet toward a vehicle width direction outer side.

17 Claims, 2 Drawing Sheets

VEHICLE INSTRUMENT PANEL STRUCTURE

CROSS-REFERENCE TO RELATED APPLICATION

This application is based on and claims priority under 35 USC 119 from Japanese Patent Application No. 2019-017041 filed on Feb. 1, 2019, the disclosure of which is incorporated by reference herein.

BACKGROUND

Technical Field

The present disclosure relates to a vehicle instrument panel structure.

Related Art

Japanese Patent Application Laid-Open (JP-A) No. 2014-76682 discloses a vehicle anti-fogging device. The vehicle anti-fogging device is provided with a side face blower outlet for blowing out conditioned air provided at a front passenger seat side of an instrument panel. A blade that turns in order to convey conditioned air toward a side window glass is provided within the side face blower outlet. When fog has condensed on the side window glass, the blade is made to turn so as to convey conditioned air toward the side window glass, thereby defogging the side window glass.

However, in the configuration disclosed in JP-A No. 2014-76682, the side face blower outlet is normally open substantially toward the vehicle rear side in order to convey conditioned air toward an occupant sitting in the front passenger seat. Thus, the conditioned air needs to be conveyed in a different direction to the orientation of the opening in order to be conveyed toward the side window glass, which is detrimental to air conveyance efficiency. Moreover, the side face blower outlet is exposed to view from the vehicle cabin interior, which is detrimental to external styling. The related art described above leaves room for improvement in these respects.

SUMMARY

In consideration of the above circumstances, the present disclosure provides an vehicle instrument panel structure capable of efficiently removing fog from a side window glass, and also capable of improving external styling.

A vehicle instrument panel structure according to a first aspect of the present disclosure includes a blower outlet and a guide member. The blower outlet is provided between a meter section on an instrument panel provided at a front section of a vehicle cabin and an interior member of a vehicle door, and is capable of blowing an airflow substantially toward a vehicle rear side. The guide member is provided at the vehicle rear side of the blower outlet so as to block the blower outlet from view of an occupant sitting in a vehicle seat provided inside the vehicle cabin, and extends at an angle toward the vehicle rear side on progression from a location corresponding to the blower outlet toward a vehicle width direction outer side.

In the first aspect of the present disclosure, the blower outlet is blocked from the view of an occupant seated in the vehicle seat by the guide member, and so the occupant sitting in the vehicle seat is less likely to notice the blower outlet. This enables detriment to the external styling due to the blower outlet being exposed to view from the vehicle cabin interior to be suppressed.

Moreover, the guide member provided at the vehicle rear side of the blower outlet extends at an angle toward the vehicle rear side on progression from the location corresponding to the blower outlet toward the vehicle width direction outer side. Thus, airflow blown out through the blower outlet substantially toward the vehicle rear side is smoothly guided toward the vehicle width direction outer side by the guide member. This enables the airflow to be made to efficiently contact a side window glass at the vehicle width direction outer side of the instrument panel, thereby enabling fog that has condensed on the side window glass to be efficiently removed.

A vehicle instrument panel structure according to a second aspect of the present disclosure is the the first aspect, wherein a vehicle cabin inner face of the guide member extends contiguously to the meter section.

In the second aspect of the present disclosure, the vehicle cabin inner face of the guide member extends contiguously to the meter section on the instrument panel, thereby enhancing the unified feel of the external styling of the guide member and the meter section, and therefore the instrument panel.

A vehicle instrument panel structure according to a third aspect of the present disclosure is the first aspect or the second aspect, wherein a display device configured to display information toward the vehicle cabin is provided to the guide member.

In the third aspect of the present disclosure, the display device for displaying information is provided to the guide member, thereby eliminating the need to provide a separate structure and space in order to attach the display device to the instrument panel.

A vehicle instrument panel structure according to a fourth aspect of the present disclosure is any one of the first aspect to the third aspect, wherein the blower outlet is formed in a slit shape with a length direction following an extension direction of the guide member toward the vehicle width direction outer side.

In the fourth aspect of the present disclosure, the extension direction of the guide member and the length direction of the blower outlet are parallel to each other, such that the blower outlet is more easily blocked from the view of an occupant by the guide member without needing to reduce the opening area of the blower outlet. Namely, since the blower outlet is less apparent, a reduction in the flow rate of airflow due to reducing the opening area of the blower outlet can be avoided.

A vehicle instrument panel structure according to a fifth aspect of the present disclosure is any one of the first aspect to the fourth aspect, wherein the guide member is formed in a substantially plate shape, and the blower outlet is provided at a position near to a vehicle cabin outer face of the guide member.

In the fifth aspect of the present disclosure, airflow blown out through the blower outlet flows more readily along the vehicle cabin outer face of the substantially plate shaped guide member, such that the airflow can flow toward the side window glass in a state in which the airflow does not readily separate from the vehicle cabin outer face of the guide member, according to what is referred to as the Coanda effect. This enables the airflow to be made to efficiently contact the side window glass.

The vehicle instrument panel structure according to the first aspect of the present disclosure exhibits an effect of enabling fog on the side window glass to be efficiently removed, and also enabling external styling to be improved.

The vehicle instrument panel structure according to the second aspect of the present disclosure exhibits an effect of enabling external styling to be further improved.

The vehicle instrument panel structure according to the third aspect of the present disclosure exhibits an effect of enabling the space inside the vehicle cabin to be effectively utilized.

The vehicle instrument panel structure according to the fourth aspect of the present disclosure exhibits effects of enabling the external styling to be improved while further improving the anti-fogging properties of the side window glass.

The vehicle instrument panel structure according to the fifth aspect of the present disclosure exhibits an effect of enables the anti-fogging properties of the side window glass to be further improved.

BRIEF DESCRIPTION OF THE DRAWINGS

Exemplary embodiments of the present disclosure will be described in detail based on the following figures, wherein.

DETAILED DESCRIPTION

Figure 1:
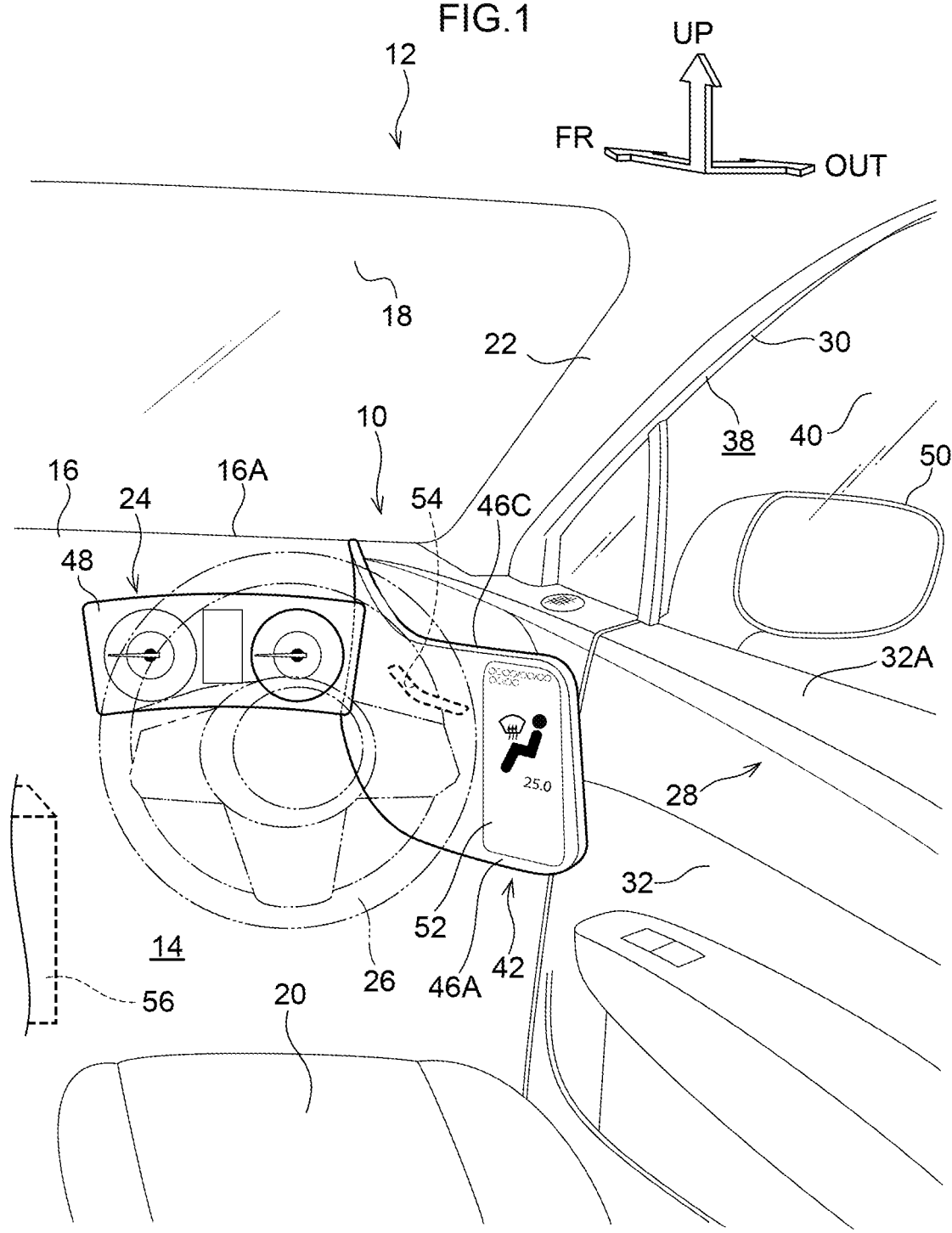
FIG. 1 is a schematic perspective view illustrating an instrument panel including a vehicle instrument panel structure according to an exemplary embodiment, as viewed obliquely from a vehicle rear side.
Figure 2:
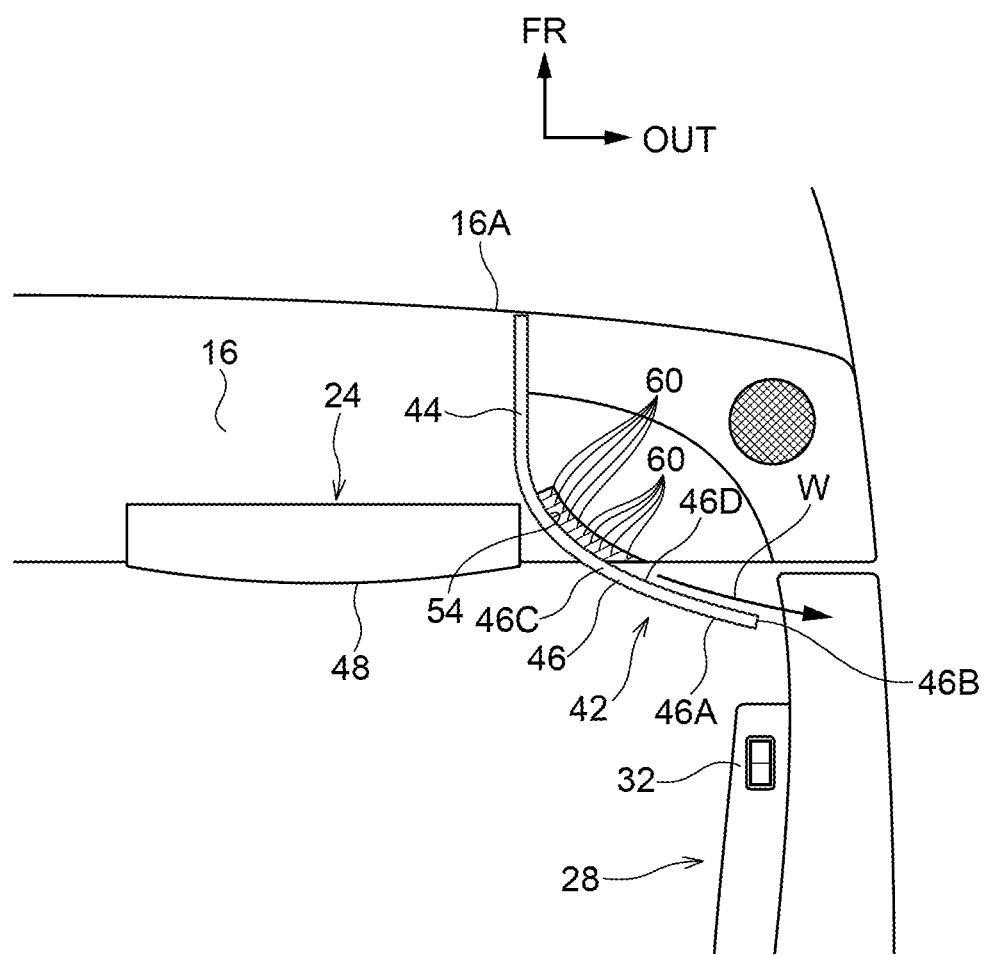
FIG. 2 is a plan view illustrating an instrument panel including a vehicle instrument panel structure according to an exemplary embodiment.

Explanation follows regarding a vehicle instrument panel structure 10 of the present disclosure, with reference to FIG. 1 and FIG. 2. Note that in the drawings, the arrow FR, the arrow UP, and the arrow OUT respectively indicate a forward direction (a direction of travel), an upward direction, and a vehicle width direction outer side of a vehicle as appropriate. In the following explanation, unless specifically stated otherwise, reference simply to front and rear, left and right, and upward and downward directions refers to front and rear in a vehicle front-rear direction, left and right in a vehicle left-right direction (vehicle width direction), and upward and downward in a vehicle vertical direction.

Overall Configuration

An instrument panel 16 is provided in a front section of a vehicle cabin 14 of a vehicle 12. The instrument panel 16 is disposed at an upper side of a vehicle rear side of a dash panel (not illustrated in the drawings) that partitions the vehicle cabin 14 from a vehicle front section. A lower end portion of the dash panel is joined to a front end portion of a non-illustrated floor panel. The floor panel configures a lower surface in the vehicle cabin 14. A non-illustrated cowl is joined to an upper end portion of the dash panel. The cowl supports a lower end portion of a front glass 18. The front glass 18 configures a front surface at an upper side of the vehicle cabin 14, and a lower end portion side of the front glass 18 is disposed at a front end portion 16A side of the instrument panel 16.

Vehicle seats 20, serving as front vehicle seats, are provided at the vehicle rear side of the instrument panel 16. In the present exemplary embodiment, a vehicle seat 20 at the left side of the front section of the vehicle cabin 14 configures a front passenger seat (not illustrated in the drawings), and a vehicle seat 20 at the right side of the front section of the vehicle cabin 14 configures a driving seat.

The instrument panel 16 is configured as an interior panel member extending along the vehicle width direction. Elongated instrument panel reinforcement (not illustrated in the drawings) is installed so as to run along the vehicle width direction at a (vehicle front side) upper portion within the instrument panel 16, and the instrument panel 16 is attached to the instrument panel reinforcement at plural locations. Note that the instrument panel reinforcement is a metal pipe member, and the two length direction end portions of the instrument panel reinforcement are fixed to vehicle lower sides of a pair of front pillars 22 (left and right framework members; the front pillar 22 on the left side is not illustrated) projecting upright at left and right vehicle body side sections.

A meter section 24 is provided on the driving seat side of the instrument panel 16. The meter section 24 is provided at an upper portion of the instrument panel 16 at a position corresponding to a steering wheel 26, and is configured including a display panel 48 formed in a substantially rectangular shape with its length direction substantially in the vehicle width direction so as to face into the vehicle cabin 14. As an example, the display panel 48 is configured by a liquid crystal panel, and is capable of displaying the speed of the vehicle 12 and an operation status and the like of a power unit.

A vehicle door 28 is provided at a side section of the vehicle 12. The vehicle door 28 is configured including a door frame 30 serving as a door frame configuring the vehicle door 28, and a door trim 32 serving as an interior member provided at the vehicle cabin inner side of the vehicle door 28. An opening 38 that is open substantially in the vehicle width direction is provided between a vehicle upper side end portion 32A of the door trim 32 and the door frame 30. A side window glass 40 supported by a non-illustrated raising/lowering mechanism is provided inside the opening 38. Note that the side window glass 40 has a laminated structure configured by layering plural sheets of transparent glass, and is capable of being moved substantially along the vehicle vertical direction within the vehicle door 28 by the raising/lowering mechanism.

Guide Member

A decorative panel 42 is provided at a location between the meter section 24 on the instrument panel 16 and the door trim 32. As illustrated in FIG. 2, the decorative panel 42 is formed in a substantially L-shape in a vehicle plan view by a first side wall 44 and a second side wall 46 serving as a guide member. The first side wall 44 is formed in a plate shape with its thickness direction substantially along the vehicle width direction, and extends in the vehicle front-rear direction from the front end portion 16A of the instrument panel 16 to the vicinity of the meter section 24.

The second side wall 46 is formed in a plate shape with its thickness direction substantially in the vehicle front-rear direction, and extends at an angle toward the vehicle rear side on progression from a vehicle rear side end portion of the first side wall 44 toward the vehicle width direction outer side. Thus, in terms of external styling, a vehicle cabin inner face 46A of the second side wall 46 extends substantially along the vehicle width direction contiguously to the display panel 48 of the meter section 24 (see FIG. 1).

A vehicle width direction outer side end portion 46B of the second side wall 46 is provided at a vehicle front-rear direction position aligned with an external mirror 50 (see FIG. 1) so as to be spaced apart from the door trim 32. Note that a join location where the first side wall 44 and the second side wall 46 are connected together is gently curved.

As illustrated in FIG. 1, a display device 52 is provided to the second side wall 46. The display device 52 is embedded inside the second side wall 46, is configured including a liquid crystal panel that displays information on the vehicle cabin inner face 46A of the second side wall 46, and is connected to a non-illustrated information display control device so as to be capable of communicating therewith. This enables desired information to be displayed toward the vehicle cabin 14. Note that in the present exemplary embodiment as an example, a substantially vehicle vertical direction dimension of the second side wall 46 is set larger than a vehicle vertical direction dimension of the meter section 24, and an upper end portion 46C of the second side wall 46 is set at a height at which a blower outlet 54, described later, is blocked by the second side wall 46 when an occupant of ordinary height sitting in the corresponding vehicle seat 20 looks toward the front of the vehicle.

Air Conditioner

A vehicle air conditioner 56 is provided inside the vehicle cabin 14. The vehicle air conditioner 56 includes non-illustrated air conditioner ducts and the blower outlet 54, described below. As an example, the vehicle air conditioner 56 is disposed at the vehicle front side and lower side of the instrument panel 16 of the vehicle 12. The vehicle air conditioner 56 is provided with a non-illustrated main fan such that an airflow is formed when the main fan is actuated. An evaporator, a heater core, and the like (none of which are illustrated in the drawings) are provided on the airflow downstream side of the main fan, and the temperature, humidity and the like of the airflow are adjusted to create regulated air. The airflow is conveyed through the interior of the air conditioner duct connected to the vehicle air conditioner 56 and out through the blower outlet 54 as conditioned air. Note that in addition to the blower outlet 54, described below, the vehicle air conditioner 56 is also connected to air conditioner ducts connected to blower outlets provided at various positions, and is connected to a non-illustrated control device so as to be capable of communicating therewith, so as to be capable of conveying conditioned air through the blower outlet 54 and each of the other blower outlets at different temperatures and different flow rates according to instructions from the control device.

Blower Outlet

As illustrated in FIG. 2, the blower outlet 54 is provided between the meter section 24 on the instrument panel 16 and the door trim 32 so as to be disposed at the vehicle front side of the decorative panel 42. The blower outlet 54 is formed in a slit shape with its length direction following an extension direction of the second side wall 46 that runs substantially along the vehicle width direction in a vehicle front-on view, and is provided near to a vehicle cabin outer face 46D of the second side wall 46. A louver 60 is provided within the blower outlet 54. An airflow W from the vehicle air conditioner 56 (see FIG. 1) can be blown substantially toward the vehicle rear side and substantially toward the vehicle upper side by the louver 60.

Operation and Effects

Explanation follows regarding operation and effects of the present exemplary embodiment.

As illustrated in FIG. 1, in the present exemplary embodiment, the second side wall 46 blocks the blower outlet 54 from the view of an occupant sitting in the vehicle seat 20. The occupant sitting in the vehicle seat 20 is therefore less likely to notice the blower outlet 54. This enables detriment to the external styling due to the blower outlet 54 being exposed to view from the vehicle cabin interior to be suppressed.

Moreover, the second side wall 46 provided at the vehicle rear side of the blower outlet 54 extends at an angle toward the vehicle rear side on progression from a location corresponding to the blower outlet 54 toward the vehicle width direction outer side (see FIG. 2). Thus, the airflow W blown out through the blower outlet 54 substantially toward the vehicle rear side is smoothly guided toward the vehicle width direction outer side by the second side wall 46. This enables the airflow W to be made to efficiently contact the side window glass 40 at the vehicle width direction outer side of the instrument panel 16, thereby enabling fog that has condensed on the side window glass 40 to be efficiently removed. This enables fog on the side window glass 40 to be efficiently removed, and also enables external styling to be improved.

Further, the vehicle cabin inner face 46A of the second side wall 46 extends contiguously to the meter section 24 on the instrument panel 16, thereby enhancing the unified feel of the external styling of the second side wall 46 and the meter section 24, and therefore the instrument panel 16. This enables external styling to be further improved.

Moreover, the display device 52 for displaying information is provided to the second side wall 46, thereby eliminating the need to provide a separate structure and space in order to attach the display device 52 to the instrument panel 16. This enables the space inside the vehicle cabin 14 to be effectively utilized.

Moreover, as illustrated in FIG. 2, the extension direction of the second side wall 46 and the length direction of the blower outlet 54 are parallel to each other, such that the blower outlet 54 is more easily blocked from the view of an occupant by the second side wall 46 without needing to reduce the opening area of the blower outlet 54. Namely, since the blower outlet 54 is less apparent, a reduction in the flow rate of the airflow W due to reducing the opening area of the blower outlet 54 can be avoided. This enables the external styling to be improved while further improving the anti-fogging properties of the side window glass 40.

Further, the airflow W blown out through the blower outlet 54 flows more readily along the vehicle cabin outer face 46D of the substantially plate shaped second side wall 46, such that the airflow W flows toward the side window glass 40 in a state in which the airflow W does not readily separate from the vehicle cabin outer face 46D of the second side wall 46, according to what is referred to as the Coanda effect. This enables the airflow W to be made to efficiently contact the side window glass 40. This enables the anti-fogging properties of the side window glass 40 to be further improved.

Note that although the vehicle cabin outer face 46D of the second side wall 46 is configured as a smooth face in the present exemplary embodiment, there is no limitation thereto. A flow-regulating section configured by fins, protrusions, or the like for regulating the airflow W blown out through the blower outlet 54 may be provided.

Although the display device 52 is provided to the second side wall 46, there is no limitation thereto, and a configuration may be applied in which the display device 52 is not provided.

Although the blower outlet 54 is formed in a slit shape in a vehicle front-on view, there is no limitation thereto, and the blower outlet 54 may be formed in a circular shape or another shape.

Although the blower outlet 54 is provided near to the vehicle cabin outer face 46D of the second side wall 46, there is no limitation thereto, and the blower outlet 54 may be provided spaced apart from the vehicle cabin outer face 46D.

Although the second side wall 46 is formed in a plate shape, there is no limitation thereto, and the second side wall 46 may be formed in a box shape or another shape.

The present disclosure is not limited to the exemplary embodiment described above, and obviously various other modifications may be implemented within a range not departing from the spirit of the present disclosure.

What is claimed is:

1. A vehicle instrument panel structure comprising:
   a blower outlet that is provided between a meter section on an instrument panel provided at a front section of a vehicle cabin and an interior member of a vehicle door, and that is capable of blowing an airflow substantially toward a vehicle rear side; and
   a guide member that is provided at the vehicle rear side of the blower outlet so as to block the blower outlet from view of an occupant sitting in a vehicle seat provided inside the vehicle cabin, and that has a front surface and a rear surface extending along a corresponding continuous curve from a location corresponding to the blower outlet toward a vehicle width direction outer side, a vehicle width direction outer side end portion of the guide member is provided rearward of a vehicle width direction inner side end portion of the guide member in a vehicle front-rear direction, the vehicle width direction inner side end portion of the guide member extending from the instrument panel.

2. The vehicle instrument panel structure of claim 1, wherein a vehicle cabin inner face of the guide member extends contiguously to the meter section.

3. The vehicle instrument panel structure of claim 1, wherein a display device configured to display information toward the vehicle cabin is provided on the guide member.

4. The vehicle instrument panel structure of claim 1, wherein the blower outlet is formed in a slit shape with a length direction following an extension direction of the guide member toward the vehicle width direction outer side.

5. The vehicle instrument panel structure of claim 1, wherein:
   the guide member is formed in a substantially plate shape; and
   the blower outlet is provided facing a vehicle cabin outer face of the guide member.

6. The vehicle instrument panel structure of claim 1, further comprising a decorative panel provided between the meter section on the instrument panel and the interior member of the vehicle door such that the decorative panel is formed by a first side wall and a second side wall serving as the guide member.

7. The vehicle instrument panel structure of claim 6, wherein the vehicle width direction outer side end portion of the guide member is provided at a vehicle front-rear direction position aligned with an external mirror so as to be spaced apart from the interior member.

8. The vehicle instrument panel structure of claim 1, wherein the guide member includes an upper end portion and an opposite lower end portion, the upper end portion and the lower end portion being free ends open to the vehicle cabin.

9. A vehicle instrument panel structure comprising:
   a blower outlet that is provided between a meter section on an instrument panel provided at a front section of a vehicle cabin and an interior member of a vehicle door, and that is capable of blowing an airflow substantially toward a vehicle rear side; and
   a guide member that is fixed to the instrument panel and provided at the vehicle rear side of the blower outlet and so as to block the blower outlet from view of an occupant sitting in a vehicle seat provided inside the vehicle cabin, and that has a front surface and a rear surface extending along a corresponding curve from a location corresponding to the blower outlet toward a vehicle width direction outer side, a vehicle width direction outer side end portion of the guide member is provided rearward of a vehicle width direction inner side end portion of the guide member in a vehicle front-rear direction, the vehicle width direction inner side end portion of the guide member extending from the instrument panel.

10. The vehicle instrument panel structure of claim 1, wherein:
    the guide member is formed in a substantially plate shape; and
    the blower outlet is provided facing a vehicle cabin outer face of the guide member.

11. The vehicle instrument panel structure of claim 1, further comprising a decorative panel provided between the meter section on the instrument panel and the interior member of the vehicle door such that the decorative panel is formed by a first side wall and a second side wall serving as the guide member.

12. The vehicle instrument panel structure of claim 11, wherein the vehicle width direction outer side end portion of the guide member is provided at a vehicle front-rear direction position aligned with an external mirror so as to be spaced apart from the interior member.

13. The vehicle instrument panel structure of claim 9, wherein the blower outlet is formed in a slit shape with a length direction following an extension direction of the guide member toward the vehicle width direction outer side.

14. The vehicle instrument panel structure of claim 9, wherein a vehicle cabin inner face of the guide member extends contiguously to the meter section.

15. The vehicle instrument panel structure of claim 9, wherein a display device configured to display information toward the vehicle cabin is provided on the guide member.

16. The vehicle instrument panel structure of claim 9, wherein the guide member includes an upper end portion and an opposite lower end portion, the upper end portion and the lower end portion being free ends open to the vehicle cabin.

17. A vehicle instrument panel structure comprising:
    a blower outlet that is provided between a meter section on an instrument panel provided at a front section of a vehicle cabin and an interior member of a vehicle door, and that is capable of blowing an airflow substantially toward a vehicle rear side; and
    a guide member that is provided at the vehicle rear side of the blower outlet so as to block the blower outlet from view of an occupant sitting in a vehicle seat provided inside the vehicle cabin, and that has a front surface and a rear surface extending along a corresponding continuous curve from a location corresponding to the blower outlet toward a vehicle width direction outer side,
    wherein a display device configured to display information toward the vehicle cabin is provided on the guide member.

* * * * *